(12) United States Patent
Khachaturov

(10) Patent No.: US 10,634,131 B2
(45) Date of Patent: Apr. 28, 2020

(54) SUBMERSIBLE PUMPING APPARATUS, COMPRISING LINEAR ELECTRIC MOTOR AND DOUBLE ACTION PUMP

(71) Applicant: Dmitrij Valerevich Khachaturov, Kharkov (UA)

(72) Inventor: Dmitrij Valerevich Khachaturov, Kharkov (UA)

( * ) Notice: Subject to any disclaimer, the term of this patent is extended or adjusted under 35 U.S.C. 154(b) by 347 days.

(21) Appl. No.: 15/539,146

(22) PCT Filed: Jan. 27, 2017

(86) PCT No.: PCT/IB2017/050433
§ 371 (c)(1),
(2) Date: Jun. 23, 2017

(87) PCT Pub. No.: WO2018/109568
PCT Pub. Date: Jun. 21, 2018

(65) Prior Publication Data
US 2019/0040858 A1    Feb. 7, 2019

(30) Foreign Application Priority Data

Dec. 14, 2016   (UA) .................................. 201612739

(51) Int. Cl.
*F04B 47/06*      (2006.01)
*F04B 15/02*      (2006.01)
(Continued)

(52) U.S. Cl.
CPC .............. *F04B 47/06* (2013.01); *E21B 37/08* (2013.01); *E21B 43/128* (2013.01); *E21B 43/38* (2013.01);
(Continued)

(58) Field of Classification Search
CPC .......... F04B 47/06; F04B 17/03; F04B 15/02; F04B 51/00; E21B 43/128; E21B 37/08;
(Continued)

(56) References Cited

U.S. PATENT DOCUMENTS 3,500,079 A * 3/1970 Barthalon ............... H02K 33/02
                                                                310/15
3,548,273 A * 12/1970 Vallauri ................. H02K 41/03
                                                                318/135
(Continued)

FOREIGN PATENT DOCUMENTS

EA         009268 B1    12/2007
RU        2521534 C2     6/2014
(Continued)

OTHER PUBLICATIONS

International Search Report on PCT/IB2017/050433—the whole document.

*Primary Examiner* — Peter J Bertheaud
*Assistant Examiner* — Dnyanesh G Kasture

(57) ABSTRACT

The invention provides the submersible pumping apparatus comprising, united in a single housing, a filtration system for the inlet of a wellbore fluid, a gravity gas separation system, a head for attachment to a tubing, a double action pump, a linear driven electric motor, a hydro-protector, and a telemetry system. The linear electric motor comprises a fixed part, a stator with a dielectric liquid which surrounds the stator, and a movable part being a slider, comprising several sections spaced-apart from the central axis of a stator housing along a diameter, and is configured to reciprocate along a longitudinal axis. The double action pump comprises two plungers; movable parts of the pump, plungers, are mechanically connected with the slider sections; fixed parts of the pump, cylinders, are arranged as follows: one cylinder is in the central part of the motor stator, and the second (Continued)

cylinder is in the inner part of the hydro-protector. Working volumes of the pump cylinders are communicated with the external environment and the outlet manifold through the system of valves. The hydro-protector is mounted in the bottom part of the apparatus and connected with the working volume of the stator through the tubular channels, and with the external environment through the filling and safety valves.

10 Claims, 4 Drawing Sheets

(51) Int. Cl.
*H02K 11/25* (2016.01)
*E21B 37/08* (2006.01)
*E21B 43/12* (2006.01)
*E21B 43/38* (2006.01)
*F04B 17/03* (2006.01)
*F04B 51/00* (2006.01)
*H02K 1/12* (2006.01)
*H02K 3/04* (2006.01)
*H02K 41/02* (2006.01)
*H02K 5/128* (2006.01)
*H02K 11/21* (2016.01)

(52) U.S. Cl.
CPC .............. *F04B 15/02* (2013.01); *F04B 17/03* (2013.01); *F04B 51/00* (2013.01); *H02K 1/12* (2013.01); *H02K 3/04* (2013.01); *H02K 11/25* (2016.01); *H02K 41/02* (2013.01); *H02K 5/128* (2013.01); *H02K 11/21* (2016.01); *H02K 2005/1287* (2013.01)

(58) Field of Classification Search
CPC ...... E21B 43/38; H02K 41/02; H02K 41/025; H02K 41/031; H02K 43/033; H02K 33/00–33/18; H02K 11/25; H02K 1/12; H02K 3/04; H02K 2005/1287; H02K 11/21; H02K 5/128
See application file for complete search history.

(56) References Cited

U.S. PATENT DOCUMENTS

| 5,960,875 | A  | * | 10/1999 | Beauquin | ............... | E21B 43/128 |
|           |    |   |         |          |                 | 166/66.4    |
| 6,176,308 | B1 | * | 1/2001  | Pearson  | ................ | E21B 43/128 |
|           |    |   |         |          |                 | 166/65.1    |
| 2015/0176574 | A1 | * | 6/2015 | DeArman | ............... | F04B 47/06 |
|           |    |   |         |          |                 | 417/53      |
| 2017/0167249 | A1 | * | 6/2017 | Lee     | ......... | E21B 47/123 |
| 2018/0149173 | A1 | * | 5/2018 | Head    | .............. | E21B 43/128 |
| 2018/0195373 | A1 | * | 7/2018 | Bell    | ............. | E21B 43/128 |

FOREIGN PATENT DOCUMENTS

RU           2535900 C1    12/2014
RU           151393 U1    4/2015

* cited by examiner

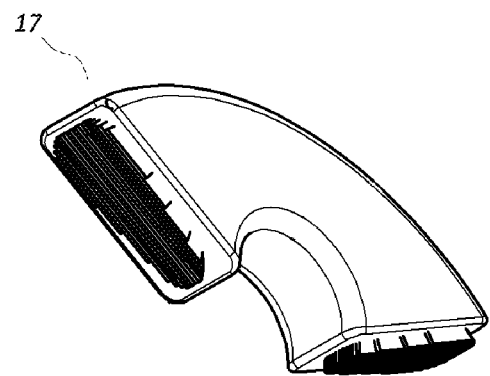
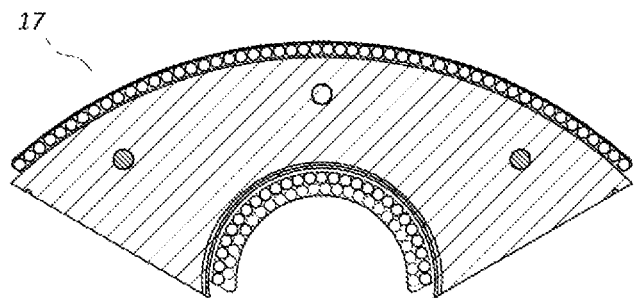
Fig. 5  Fig. 6
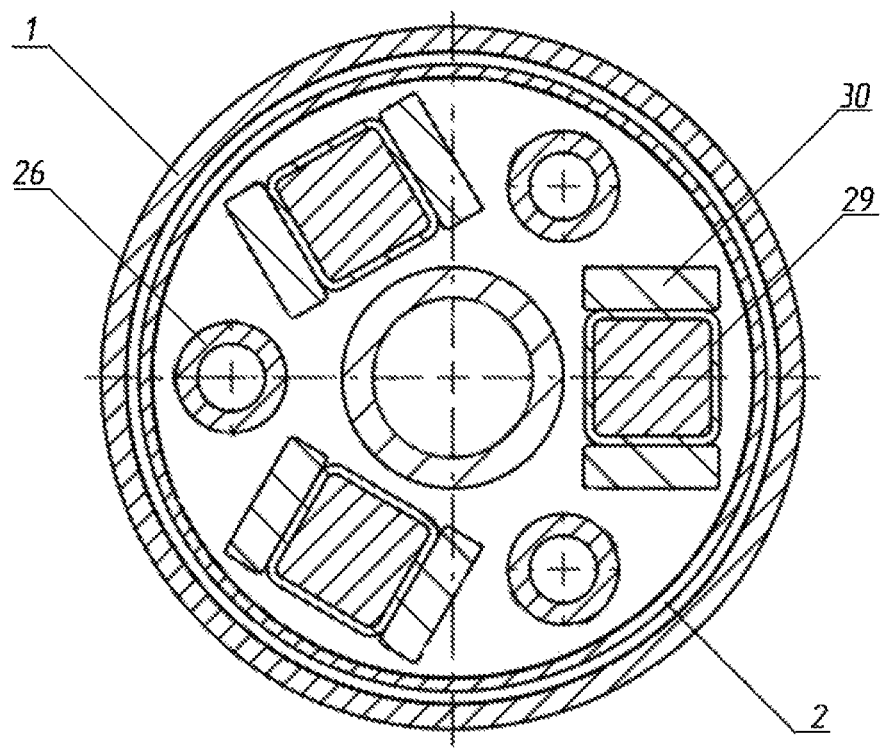
Fig. 7

SUBMERSIBLE PUMPING APPARATUS, COMPRISING LINEAR ELECTRIC MOTOR AND DOUBLE ACTION PUMP

The invention relates to a new type of pumping device in the field of mechanical engineering, in particular to apparatuses comprising displacement pumps driven by linear electric motors to produce formation fluids from low-yield wells, mainly in oil production.

In the prior art a double action pump is known—the utility model patent RU 151393, F04B 47/00. This apparatus comprises a submersible electric motor with a hydroprotection, a main pump actuator, and the main pump connected with the actuator by a rod. The main pump comprises two operating cylinders, in series connected with each other, and two hollow plungers with pressure valves mounted thereon and interconnected by a rod; the lower plunger is connected with the actuator of the main pump by means of a smooth rod; the cavity above the upper plunger is connected with the circular annular space through the upper suction valve; the cavity under the lower plunger is connected with the circular annular space through the lower suction valve; the cavity under the upper plunger is connected with the cavity above the lower plunger and with the bypass passage formed by the casing that from the outside covers the upper cylinder, wherein the bypass passage is connected with the pump discharge line.

The disadvantage of this technical solution is the presence of a seal assembly between the motor and the pump portion, thereby increasing the length of the apparatus. The presence of a large amount of valve assemblies reduces the system reliability. The outer housing of the apparatus should be designed for the total pressure of the liquid column, which leads to increasing in apparatus dimensions including diameter, and raises the requirements to material and quality of manufacturing parts and assemblies subjected to high pressure.

The double action pump driven by a submersible motor is known—the patent for the invention US 20150176574 A1, F04B 17/03, F04B 47/06, F04B 49/22. This apparatus comprises a submersible well pump consisting of a fixed cylinder and a movable plunger. The submersible motor mounted under the pump and connected with the plunger creates a reciprocating motion of the plunger. The valve assembly, which is mounted in the lower portion of the plunger, performs, when moving upwards, filling the cylinder with a borehole fluid, and when moving downwards, filling the cavity of the well pump below the plunger.

The disadvantage of this technical solution is also the presence of a seal assembly 10 between the motor and the pump portion, thereby increasing the length of the apparatus; outer housing of the apparatus should also be designed for the total pressure of the liquid column, which leads to increasing in apparatus dimensions including diameter, and raises the requirements to material and quality of manufacturing parts and assemblies subjected to high pressure.

The submersible electric pump is known—the patent for the invention RU 2521534 C2, F04B 47/06, F04B 17/. This apparatus comprises a supporting power housing inside of which a linear electric motor is placed, the linear electric motor comprises a non-movable stator and a hollow runner therein; a cavity of the electric motor formed by the stator, the housing and the runner, is filled with liquid; the runner is mounted and configured to reciprocate along the longitudinal axis of the stator; a cylindrical piston combined with the runner, a tubing, inlet and outlet valves. The runner has a sealed transverse wall which forms two cavities in the axial direction; within the at least one cavity of the runner a fixed hollow rod having a seal assembly on the outer surface is placed; the inner cavity of the rod is connected with the runner inner cavity and with an operating chamber of the pump; the operating chamber of the pump is communicated to the pumped medium and the outlet tubing through the inlet and outlet valves respectively.

The disadvantage of this technical solution is the presence of cylinders with the inner and outer working surfaces, which requires increased accuracy of processing and increases the complexity of manufacturing, and the outer housing of the apparatus should also be designed for the total pressure of the liquid column, which leads to increasing in apparatus dimensions including diameter and raises the requirements to material and quality of manufacturing parts and assemblies subjected to high pressure.

The closest analogue of the provided invention is a submersible apparatus, comprising linear motor and the double action pump—the patent for the invention RU 2535900 C1, F04B 47/06. This apparatus comprises a linear electric motor, a movable portion of which (a runner) is configured to reciprocate along the longitudinal axis, and a double action pump, the working elements (pistons) of which are mechanically connected with the runner. The pistons, fixed elements and valve boxes are located on both sides of the electric motor, forming the lower and upper parts of the pump; the operating chambers of the pump are linked to the outer environment and the outlet manifold through the suction and pressure valves respectively. The runner having a central opening is formed; the working elements (pistons) of the pump are formed as hollow cylinders; fixed elements of the pump are also formed as hollow cylinders, the working surfaces of which are in contact with the working surfaces of the pistons. The fixed elements of the pump are formed as the inner and outer cylinders relative to the piston; the operating chamber of the bottom part of the pump is connected with the outlet manifold through the pressure valve and the central hole in the runner.

The disadvantage of this technical solution is the presence of cylinders with inner and outer working surfaces, which requires increased accuracy of processing and increases the complexity of manufacturing. Mounting the pump pistons into the runner cavity of the electric motor leads to an increase in the apparatus dimensions including the apparatus diameter.

The aim of the claimed invention is to reduce the apparatus dimensions, at the same time to increase productivity, reliability and life-extension, and cost reduction.

The goals mentioned above are achieved due to the fact that the movable part of the linear motor—the slider—comprises several sections spaced from the stator housing central axis along the diameter, and in the central part of the stator a plunger of the double-acting pump is located; the second plunger is located in the inner part of the hydroprotector. The filtration and gas separation system is organized in a cavity formed by the outer housing of the apparatus and the housing of the linear motor stator. Such an embodiment of the apparatus provides a significant reduction in its length, as well as effective forced cooling of the apparatus and gas separation. The double action pump comprising two plungers, when the double stroke of the plungers performs the alternately liquid volume pumping, thereby increasing the pump outlet while reducing the required power of the actuating linear electric motor.

Other characteristics and advantages of the invention will become more apparent from the following description, given as an explanation, in combination with the attached drawings.

BRIEF DESCRIPTION OF DRAWINGS

FIG. 5 shows a single of a plurality of wound coils that constitute the stator of the apparatus;
FIG. 6 shows a cross section view of a wound coil;
FIG. 7 shows the construction of the antifriction system of the apparatus.

DETAILED DESCRIPTION OF THE INVENTION

Figure 1:
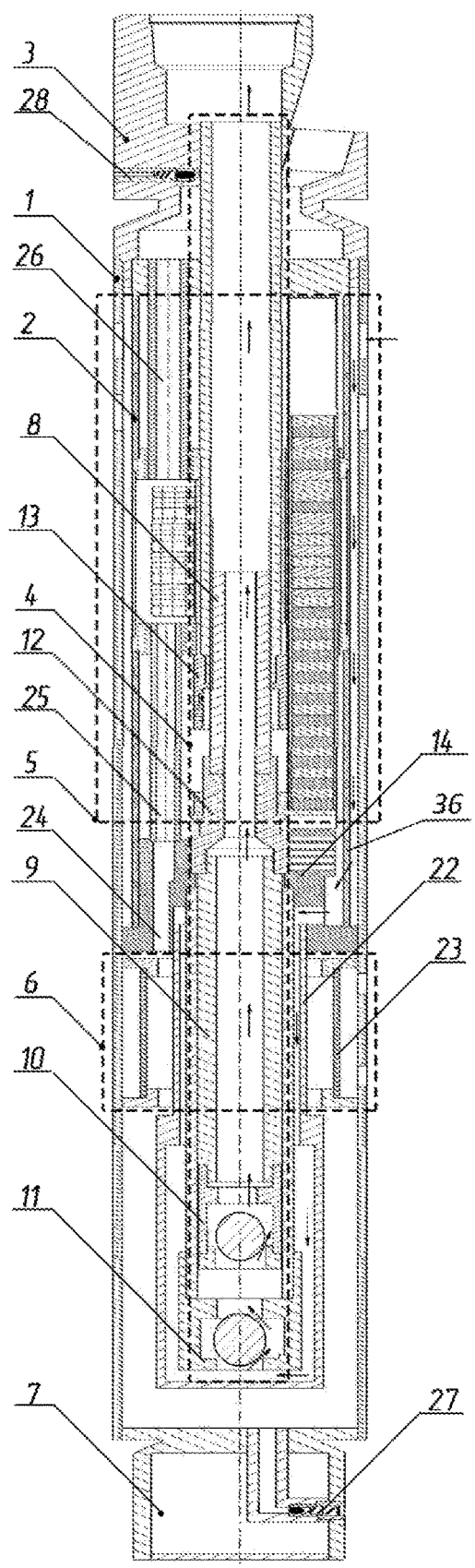
FIG. 1 shows the construction of the apparatus and shows an operating principle of the pump.
Figure 2:
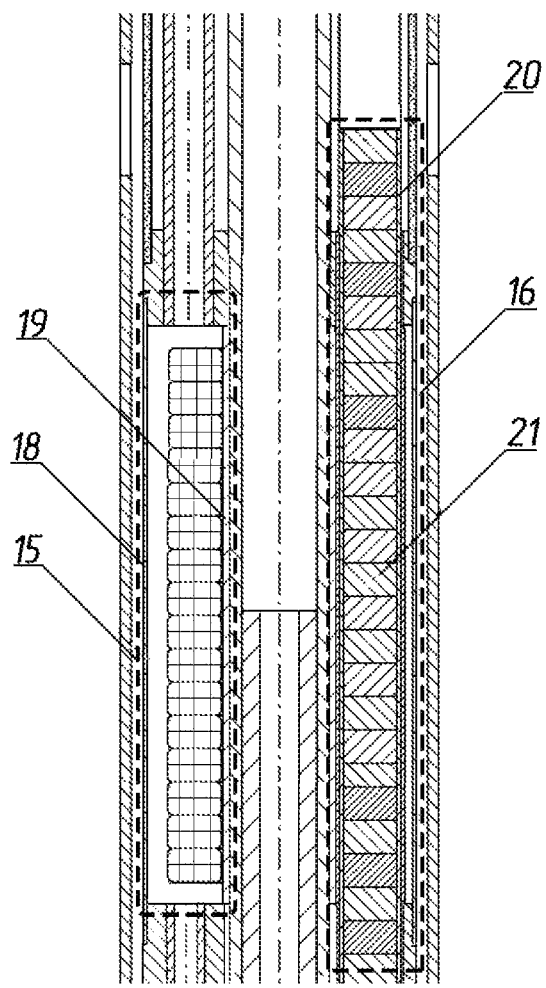
FIG. 2 shows the construction of the actuating electric motor.
Figure 3:
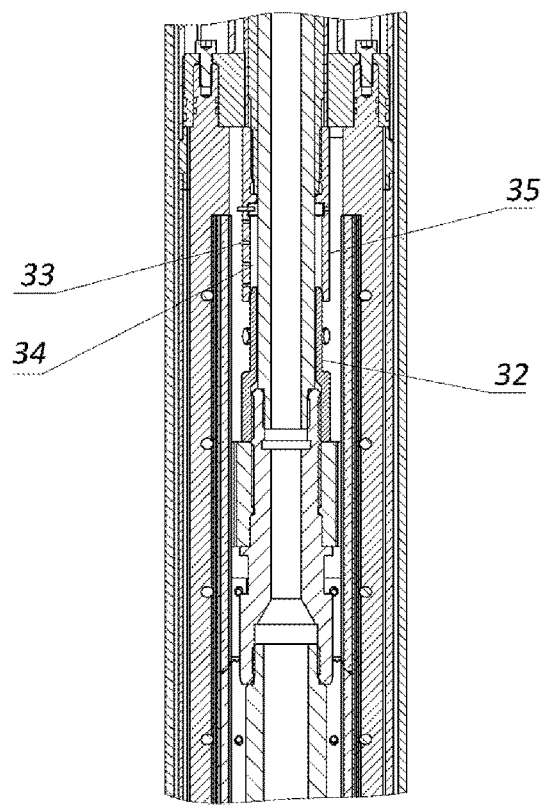
FIG. 3 shows the hydraulic damper of the apparatus.
Figure 4:
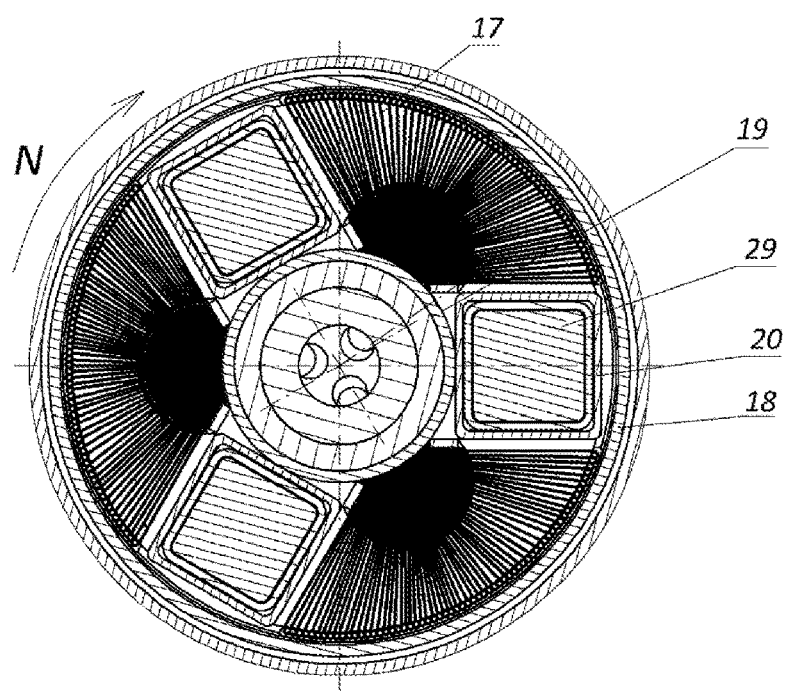
FIG. 4 shows the magnetic system of the actuating electric motor.

The submersible pumping apparatus comprises a gravity gas separation system and a head 3 for attachment to a tubing string, a double action pump 4, an actuating electric motor 5, a hydro-protector 6 and a telemetry system 7, which are united in a single housing 1 which is structurally a device provided with the filters 2 and 36 for inletting and filtration of a wellbore fluid.

The double action pump 4 is two plungers 8 and 9 of different sizes, and a system of valves 10 and 11. Plungers of different sizes are interconnected in series with the help of a sleeve 12. Furthermore, hydraulic dampers 13 and 14 provided with a valve-throttling system are placed on the cylinders of the plungers. Hydraulic dampers interact with a stopper 32 of a movable part of the apparatus through a barrel 35, and through a cavity 34 of the barrel 35 which is filled with fluid, and through holes 33 in the wall of the barrel 35.

The apparatus embodiment provides the use of ball type check valves. The valves operate synchronously. At a single point of time, the first valve is closed, and the second is open, at another point of time vice versa. Therefore, functionally, they are double-acting valves. When the plunger 8 moves upward, the valve 10 is closed and a fluid goes up into the tubing string. Wherein the valve 11 is opened since the space between the valves 10 and 11 is empty. When the plunger 8 moves downward, the valve 10 is opened since the volume above this valve is empty. Wherein the valve 11 is closed since the pressure between the valves 10 and 11 increases.

Moreover, the submersible part of the apparatus comprises the actuating electric motor 5 consisting of a fixed part being a stator 15, and the movable part being a slider 16.

The stator 15 is formed as a three-phase distributed winding connected in such a way that it has a neutral point mounted in a sealed cavity formed by two coaxially located tubes 18 and 19 with a dielectric liquid which surrounds the stator. The three-phase winding is distributed in cross section into several parts along the diameter of the apparatus, between which several profile tubes 20 are mounted and made of solid non-magnetic antifriction material. Each part of the three-phase winding comprises several coil groups, which are formed as toroidal wound coils 17 mounted on the core connected in series, in parallel and mixedly. The core is a laminated magnetic core made of a magnetically soft material. Furthermore, a temperature measuring sensor (not shown in the figure) is located in the hermetic cavity of the stator. One of the plungers 8 is located in the cavity formed by the inner tube 19 of the stator.

The slider 16 is structurally being sectional and configured to reciprocate relative to the stator 15. The slider comprises several sections 29, which are spaced apart in the cavities formed by the profile tubes 20 of the stator.

Each of the slider sections is a housing 20 inside of which magnets 21 are located. The slider sections are connected together by the sleeve 12.

Furthermore, the submersible part of the apparatus comprises the hydro-protector 6 which is formed as a tube 22 on which at least one diaphragm 23 of elastic material is mounted, tubular cavities 24, 25, 26 connecting the hydro-protector cavity formed between the diaphragm and the tube with the sealed cavity of the stator, as well as a filling 27 and safety 28 valves through which the inner cavity of the hydro-protector is connected with the external environment. The filling 27 and safety 28 valves provide and drain the electric fluid. The inner cavity of the hydro-protector is filled with a dielectric liquid. The diaphragm expands when the motor and the dielectric liquid are heated and shrinks when they cool. Thus, the external pressure is compensated to maintain operating pressure around the motor. The dielectric liquid moves between the stator and diaphragm through the cavities 24, 25, 26 depending on the mode of operation of the apparatus in accordance with the laws of physics. The dielectric fluid also improves the electrical insulating properties of the apparatus components.

Furthermore, in the area between the hydro-protector and the stator, as well as in the area between the stator and the head for attachment, the slider guides 30 are provided in the form of strips of a solid material having lubricating properties. Moreover, at least one position sensor (not shown) of the slider is mounted at the top of the hydroprotector and in the area of the head for attachment.

Furthermore, the submersible part of the apparatus comprises the telemetry system 7 located in the bottom part of the apparatus under one of the plungers and the hydro-protector. Structurally, the telemetry system comprises a sealed housing and electronics modules placed therein. The telemetry system is electrically connected to the neutral point of the stator windings and to the temperature sensor.

The submersible pumping apparatus operates as follows.

The pumping apparatus is attached to the tubing via the head 3 for attachment; the electrical connection of the apparatus to the control station is conducted by means of an isolated three-wire cable through the current lead socket.

When the control station feeds the three-phase alternating voltage to the submersible apparatus, a current flows in the sectional coils 17 of the stator creating a travelling magnetic field N. Under the influence of the travelling magnetic field, the sectional slider of the linear motor executes a translational motion, setting into motion the plungers 8 and 9 of the double action pump; when one of the two end operating points of the pump plunger is reached, the control station receives a signal from the corresponding position sensor and changes the alternation of the phases of the supplied three-phase supply voltage, so that the sectional slider of the linear motor changes its direction of motion.

When one of the two end operating points of the movable part of the apparatus is reached by the stopper 32, a fluid begins to shrink in the cavity 34 of the barrel 35. Simultaneously, the fluid begins to flow out through the holes 33 in the wall of the barrel 35. Thus, a smooth stop of the moving part is ensured.

When the pump plungers move upwards, intake of the wellbore fluid from the annular space of the well through the intake openings in the filters is conducted. The wellbore fluid passing into the cavities formed by the housing 1 of the apparatus and the housing tube 18 of the linear motor stator, is heated by the linear motor, and as a result a forced cooling of the linear motor stator is occurred, and additionally due to heating of the wellbore fluid the gas is emitted, wherein the wellbore fluid is ejected into tubing string by the plunger of the upper plunger 8 with the closed valve 10. A fluid flows down from the filters 2 or 36 to the valves 10, 11, and then flows up passing the valves 10, 11. The mass of a gas is lighter than the mass of a fluid. A gas remains at the highest point of the channel and does not reach the valves. Thus, the design of the apparatus forms a gas separation system. When moving the pump plungers downward, the wellbore fluid is forced to eject into tubing string by the plunger of the lower plunger 9 when the valve 11 is closed and the working volume of the cylinder of the upper plunger is filled via the valve 10, at the same time the wellbore fluid with a gas are inversely ejected through the filtration system providing cleaning of the filters. Fluid excess and a gas injection is ensured by the apparatus embodiment—fewer volume of fluid can pass through the valves than volume of fluid entering the apparatus. For complete filtration (for upward and downward stroke of the movable part of the apparatus) of fluid from solid particles, the apparatus comprises the filters 2 and 36.

When the sectional slider reciprocates along the slider guides 30 mounted on both sides of the linear motor stator, which are made of a solid material having lubricating properties and in constant pressure to the slider sections, the lubricating layer is transferred to the working surfaces of the slider sections, thereby ensuring minimal wear of rubbing surfaces.

The invention claimed is:

1. A submersible pumping apparatus comprising, in a single housing, a linear electric motor comprising a fixed part in the form of a sealed stator with a dielectric liquid which surrounds the stator comprising a three-phase winding with mounted temperature sensors, and a movable part being slider, wherein the movable part comprises several sections that are spaced apart in a circumferential direction of the stator, configured to reciprocate relative to the stator, and have a mechanical connection with plungers of pump; one of the plungers is located in the inner cavity of the stator, the second plunger is located in the bottom part of the apparatus in the inner cavity of a hydro-protector; pump cylinders comprise hydraulic dampers of the stroke end points; working chambers of the pump are interconnected and have a connection with an external environment through filters, located on both sides of the stator, and a suction valve, and with an outlet manifold through a check valve and a unit for attachment of an oil-well pumping apparatus to a tubing string; slider guides made of an antifriction material and position sensors are mounted on both sides of the stator; mounted in the bottom part, a telemetry system comprises pressure and temperature sensors for a borehole fluid, a vibration sensor, an inclinometer, a measuring unit connected to the temperature sensors mounted in the electric motor stator, and the telemetry system is connected to a main surface control unit via the neutral point of the electric motor windings.

2. The apparatus according to claim 1, wherein a magnetic system is organized by toroidal coils of the stator, in the gap of which the sections of the slider with permanent magnets are placed.

3. The apparatus according to claim 1, wherein the three-phase stator windings are formed as sectional coils with toroidal winding, and a core located inside the coils is made of laminated iron.

4. The apparatus according to claim 1, wherein the movable part of the linear motor, the slider, comprises several sections located in the cavities of the stator which are spaced apart in a circumferential direction and configured to reciprocate relative to the stator, and which are mechanically connected with the pump plungers.

5. The apparatus according to claim 1, wherein the slider guides made of a solid material having lubricating properties are mounted on both sides of the stator, the slider guides being pressed constantly against the slider sections and allowing the transfer of the antifriction layer to the working surfaces of the slider sections, thereby providing minimal wear of rubbing surfaces.

6. The apparatus according to claim 1, wherein the slider position sensors having electrical connection to the main surface control unit through the neutral point of the motor windings, an insulated three-wire cable and the neutral point of the secondary winding of an outlet transformer are mounted on both sides of the stator.

7. The apparatus according to claim 1, wherein it comprises two plungers, the first plunger is located in the inner cavity of the stator, and the second plunger is located in the bottom part of the apparatus in the inner cavity of the hydraulic compensator, and which have a communication between the working volumes through the inner cavity of the plungers.

8. The apparatus according to claim 1, wherein the hydraulic dampers mounted at the ends of the cylinders are provided with a valve-throttling device and allow providing protection of the pump from the impact when the end points of the upward and downward stroke are reached.

9. The apparatus according to claim 1, wherein an outer tube of the apparatus has 20 intake openings in the upper part and forms a cavity for flowing borehole fluid along an outer tube of the stator.

10. The apparatus according to claim 1, wherein a gas separation system is structurally formed in a cavity that is bounded by an outer tube of the apparatus, an outer tube of the stator and the filters located on both sides of the stator.

* * * * *